United States Patent [19]

Ishikura et al.

[11] 4,309,327
[45] Jan. 5, 1982

[54] POLYMERIC RESIN FROM ETHYLENIC AMINO, SULFONIC MONOMERS

[75] Inventors: Shinichi Ishikura, Takatsuki; Ryuzo Mizuguchi, Yahata; Keizou Ishii, Ashiya; Tamotu Yoshioka, Hirakata, all of Japan

[73] Assignee: Nippon Paint Co., Ltd., Osaka, Japan

[21] Appl. No.: 82,585

[22] Filed: Oct. 9, 1979

[30] Foreign Application Priority Data

Mar. 1, 1979 [JP] Japan .................................. 54-24356
Mar. 1, 1979 [JP] Japan .................................. 54-24357

[51] Int. Cl.³ ............................................. C08F 228/00
[52] U.S. Cl. ...................... 260/29.6 H; 260/29.6 TA; 260/42.21; 525/185; 525/186; 526/72; 526/273; 526/287; 427/409; 428/461
[58] Field of Search ...................... 526/273, 287, 312; 260/29.6 TA, 29.6 H, 42.21

[56] References Cited

U.S. PATENT DOCUMENTS 3,547,899 12/1970 Arlt .................................... 526/287
3,937,802 2/1976 Fujimoto ........................ 526/287 X
4,177,178 12/1979 Das .................................. 526/287 X Primary Examiner—C. A. Henderson
Attorney, Agent, or Firm—Wenderoth, Lind & Ponack

[57] ABSTRACT

A coating composition comprising as a main component a polymeric resin obtained by solution polymerization of at least one of polymerizable amino acid compounds of either one of the formulas:

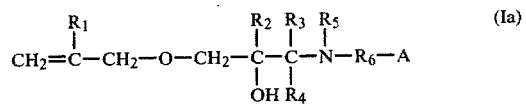

(Ia)

wherein $R_1$, $R_2$, $R_3$ and $R_4$ are each hydrogen, methyl or ethyl, $R_5$ is hydrogen or $C_1$-$C_{20}$ alkyl optionally having —SO—, —COO— or —O— therein, $R_6$ is $C_1$-$C_{12}$ alkylene optionally substituted with —OH, —SH or —SR$_7$ ($R_7$ being $C_1$-$C_4$ alkyl) and/or optionally substituted with $C_1$-$C_4$ alkyl or phenylene optionally substituted with $C_1$-$C_4$ alkyl and A is —COOH or —SO$_3$H, and

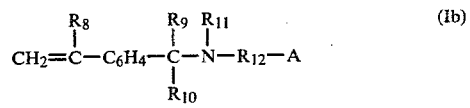
(Ib)

wherein $R_8$, $R_9$ and $R_{10}$ are each hydrogen or $C_1$-$C_6$ alkyl, $R_{11}$ is hydrogen or $C_1$-$C_{20}$ alkyl optionally having —SO—, —COO— or —O— therein, or a group of the formula:

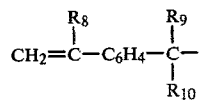

($R_8$, $R_9$ and $R_{10}$ being each as defined above), $R_{12}$ is $C_2$-$C_{12}$ alkylene optionally substituted with $C_1$-$C_6$ alkyl or phenylene optionally substituted with $C_1$-$C_4$ alkyl, and A is as defined above, with or without at least one of other polymerizable monomers.

10 Claims, No Drawings

POLYMERIC RESIN FROM ETHYLENIC AMINO, SULFONIC MONOMERS

SUMMARY OF THE INVENTION

The present invention relates to a polymeric resin and a coating composition comprising the same. More particularly, it relates to a polymeric resin obtained by polymerization of a polymerizable amino acid compound with or without any other polymerizable monomer and a coating composition comprising such polymeric resin as a main component.

In this specification, the terms "dispersing" and "dispersion" are used in their broad sense and include "dissolving" and "solution".

As the result of an extensive study, it has been found that a polymeric resin obtained by solution polymerization of a certain specific polymerizable amino acid compound with or without any other polymerizable monomer has an excellent pigment dispersibility and is usable as a resin for dispersing a pigment to provide a coating composition. It has also been found that when a hydroxyl group-containing polymerizable monomer is used as the other polymerizable monomer, a composition comprising the resulting polymeric resin and an aminoplast resin can be readily cured at a low temperature within a short period of time. It has further been found that when a carboxyl group-containing polymerizable monomer is used as the other polymerizable monomer, the resultant polymeric resin is dispersible in water to give a stable water dispersion. It has furthermore been found that a composition comprising such water dispersion and an aminoplast resin can afford a coating film having excellent physical properties. The present invention is based on these findings.

DETAILED DESCRIPTION OF THE INVENTION

The most characteristic feature of the present invention resides in the use of certain specific polymerizable amino acid compounds for production of polymeric resins, which are employed as the main component in a coating composition. Such polymerizable amino acid compounds are representable by either one of the following formulas:

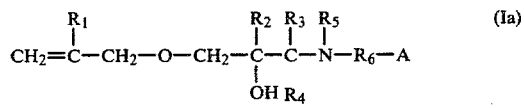

wherein $R_1$, $R_2$, $R_3$ and $R_4$ are each hydrogen, methyl or ethyl, $R_5$ is hydrogen or $C_1$–$C_{20}$ alkyl optionally having —SO—, —COO— or —O— therein, $R_6$ is $C_1$–$C_{12}$ alkylene optionally substituted with —OH, —SH or —SR$_7$ ($R_7$ being $C_1$–$C_4$ alkyl) and/or optionally substituted with $C_1$–$C_4$ alkyl or phenylene optionally substituted with $C_1$–$C_4$ alkyl and A is —COOH or —SO$_3$H, or

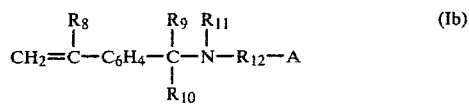

wherein $R_8$, $R_9$ and $R_{10}$ are each hydrogen or $C_1$–$C_6$ alkyl, $R_{11}$ is hydrogen or $C_1$–$C_{20}$ alkyl optionally having —SO—, —COO— or —O— therein, or a group of the formula:

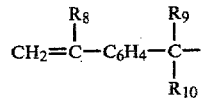

($R_8$, $R_9$ and $R_{10}$ being each as defined above), $R_{12}$ is $C_2$–$C_{12}$ alkylene optionally substituted with $C_1$–$C_6$ alkyl or phenylene optionally substituted with $C_1$–$C_4$ alkyl, and A is as defined above. Among them, the compounds of the formula (Ia) wherein $R_6$ is $C_1$–$C_{12}$ alkylene optionally substituted with —OH, —SH or —SR$_7$ and/or optionally substituted with $C_1$–$C_4$ alkyl (hereinafter referred to as "the compounds (Ia')") and the compounds of the formula (Ib) wherein $R_{12}$ is $C_2$–$C_{12}$ alkylene optionally substituted with $C_1$–$C_6$ alkyl and A is —SO$_3$H (hereinafter referred to as "the compounds (Ib')") are novel and are described in Japanese Patent Applications Nos. 123899/1978 and 125996/1978. See copending U.S. patent application Ser. No. 82,586, filed Oct. 9, 1979.

The compounds (Ia) can be produced by reacting an oxirane compound with an amino acid compound having a primary or secondary amino group, preferably under basic conditions. A typical procedure comprises reacting them in the presence of a basic substance (e.g. alkali metal hydroxides, ammonia, organic amines) in a solvent such as alcohols, ethylene glycol monoalkyl ethers, dimethylformamide, dimethylsulfoxide or water, or their mixtures at a temperature of 0° to 150° C. under atmospheric or elevated pressure for a period of 10 minutes to 48 hours, usually while stirring.

Examples of the compounds (Ia) are as follows: N-(2-hydroxy-3-allyloxypropyl)taurine, 2-[N-(2-hydroxy-3-allyloxypropyl)amino]propanesulfonic acid-(1), 1-[N-(2-hydroxy-3-allyloxypropyl)amino]propanesulfonic acid-(2), 3-[N-(2-hydroxy-3-allyloxypropyl)amino]butanesulfonic acid(2), 2-[N-(2-hydroxy-3-allyloxypropyl)amino]butanesulfonic acid-(1), 1-[N-(2-hydroxy-3-allyloxypropyl)amino]-2-methylpropanesulfonic acid-(2), 3-[N-(2-hydroxy-3-allyloxypropyl)amino]pentanesulfonic acid-(2), 4-[N-(2-hydroxy-3-allyloxypropyl)amino]-2-methylpentanesulfonic acid-(3), 3-[N-(2-hydroxy-3-allyloxypropyl)amino]propanesulfonic acid-(1), 4-[N-(2-hydroxy-3-allyloxypropyl)amino]butanesulfonic acid(2), 4-[N-(2-hydroxy-3-allyloxypropyl)amino]butanesulfonic acid-(1), 5-[N-(2-hydroxy-3-allyloxypropyl)amino]pentanesulfonic acid-(1), 10-[N-(2-hydroxy-3-allyloxypropyl)amino]decanesulfonic acid-(1), N-methyl-N-(2-hydroxy-3-allyloxypropyl)taurine, N-ethyl-N-(2-hydroxy-3-allyloxypropyl)taurine, N-propyl-N-(2-hydroxy-3-allyloxypropyl)taurine, N-butyl-N-(2-hydroxy-3-allyloxypropyl)taurine, N-heptyl-N-(2-hydroxy-3-allyloxypropyl)taurine, N-dodecyl-N-(2-hydroxy-3-allyloxypropyl)taurine, N-heptadecyl-N-(2-hydroxy-3-allyloxypropyl)taurine, N-(2-octadecylsulfinethyl)-N-(2-hydroxy-3-allyloxypropyl)taurine, N-(2-stearoyloxyethyl)-N-(2-hydroxy-3-allyloxypropyl)taurine, N-(2-hydroxy-3-methallyloxypropyl)taurine, N-(1-methyl-2-hydroxy-3-allyloxypropyl)taurine, N-(2-hydroxy-3-allyloxypropyl)glycine, N-(2-hydroxy-3-methallyloxypropyl)glycine, N-(2-hydroxy-3-methallyloxypropyl)sarcosine, N-(2-hydroxy-3-allyloxypropyl)alanine, N-(2-hydroxy-3-allyloxypropyl)-β-alanine, N-methyl-N-(2-hydroxy-3- allyloxypropyl)-β-alanine, N-ethyl-N-(2-hydroxy-3-allyloxypropyl)-β-alanine, N-butyl-N-(2-hydroxy-3-allyloxypropyl)-β-alanine, N-(2-hydroxy-3-allyloxypropyl)-β-alanine, N-heptadecyl-N-(2-hydroxy-3-allyloxypropyl)-β-alanine, N-(1-methyl-2-hydroxy3-allyloxypropyl)-β-alanine, N-(2-hydroxy-3-allyloxypropyl)ε-aminocapronic acid, N-(2-hydroxy-3-allyloxypropyl)threonine, N-(2-hydroxy-3-allyloxypropyl)cysteine, N-(2-hydroxy-3-allyloxypropyl)cysteine, N-(2-hydroxy-3-allyloxypropyl)methionine, N-(2-hydroxy-3-allyloxypropyl)anthranilic acid, N-(2-hydroxy-3-allyloxypropyl)-m-aminobenzoic acid, N-(2-hydroxy-3-allyloxypropyl)-p-aminobenzoic acid, N-(2-hydroxy-3-allyloxypropyl)orthanilic acid, N-(2-hydroxy-3-allyloxypropyl)metanilic acid, N-(2-hydroxy-3-allyloxypropyl)sulfanilic acid, etc.

The compounds (Ib) can be produced by reacting a benzyl halide compound with an aminosulfonic acid compound having a primary or secondary amino group, preferably under basic conditions. A typical procedure comprises reacting them in the presence of a basic substance (e.g. alkali metal hydroxides, ammonia, organic amines) in a solvent such as alcohols, ethylene glycol monoalkyl ethers, dimethylformamide, dimethylsulfoxide or water, or their mixtures at a temperature of 0° to 150° C. under atmospheric or elevated pressure for a period of 10 minutes to 48 hours, usually while stirring.

Examples of the compounds (Ib) are as follows: N-(vinylbenzyl)taurine, N-(isopropenylbenzyl)taurine, 2-(N-vinylbenzylamino)propanesulfonic acid-(1), 2-(N-isopropenylbenzylamino)propanesulfonic acid-(1), 1-(N-vinylbenzylamino)propanesulfonic acid-(2), 1-(N-isopropenylbenzylamino)propanesulfonic acid-(2), 3-(N-vinylbenzylamino)butanesulfonic acid-(2), 3-(N-isopropenylbenzylamino)butanesulfonic acid(2), 2-(N-vinylbenzylamino)butanesulfonic acid-(1), 2-(N-isopropenylbenzylamino)butanesulfonic acid-(1), 1-(N-vinylbenzylamino)-2-methylpropanesulfonic acid-(2), 1-(N-isopropenylbenzylamino)-2-methylpropanesulfonic acid-(2), 3-(N-vinylbenzylamino)pentanesulfonic acid-(2), 3-(N-isopropenylbenzylamino)pentanesulfonic acid-(2), 4-(N-vinylbenzylamino)-2-methylpentanesulfonic acid-(3), 4-(N-isopropenylbenzylamino)-2-methylpentanesulfonic acid-(3), 3-(N-vinylbenzylamino)propanesulfonic acid-(1), 3-(N-isopropenylbenzylamino)-propanesulfonic acid-(1), 4-(N-vinylbenzylamino)butanesulfonic acid-(2), 4-(N-isopropenylbenzylamino)butanesulfonic acid-(2), 4-(N-vinylbenzylamino)butanesulfonic acid-(1), 4-(N-isopropenylbenzylamino)butanesulfonic acid-(1), 5-(N-vinylbenzylamino)pentanesulfonic acid-(1), 5-(N-(isopropenylbenzylamino)pentanesulfonic acid-(1), 10-(N-vinylbenzylamino)decanesulfonic acid-(1), 10-(N-isopropenylbenzylamino)decanesulfonic acid-(1), N-methyl-N-vinylbenzyltaurine, N-methyl-N-isopropenylbnzyltaurine, N-ethyl-N-vinylbenzyltaurine, N-ethyl-N-isopropenylbenzyltaurine, N-propyl-N-vinylbenzyltaurine, N-propyl-N-isopropenylbenzyltaurine, N-butyl-N-vinylbenzyltaurine, N-butyl-N-isopropenylbenzyltaurine, N-heptyl-N-vinylbenzyltaurine, N-heptyl-N-isopropenylbenzyltaurine, N-dodecyl-N-vinylbenzyltaurine, N-dodecyl-N-isopropenylbenzyltaurine, N-heptadecyl-N-vinylbenzyltaurine, N-heptadecyl-N-isopropenylbenzyltaurine, N-(2-octadecylsulfinethyl)-N-vinylbenzyltaurine, N-(2-octadecylsulfinethyl)-N-isopropenylbenzyltaurine, N-(2-stearoyloxyethyl)-N-vinylbenzyltaurine, N-(2-stearoyloxyethyl)-N-isopropenylbenzyltaurine, 2-(N-vinylbenzyl-N-methylamino)propanesulfonic acid-(1), 2-(N-isopropenylbenzyl-N-methylamino)propanesulfonic acid-(1), 2-(N-dodecyl-N-vinylbenzylamino)propanesulfonic acid-(1), 2-(N-dodecyl-N-isopropenylbenzylamino)propanesulfonic acid-(1), 2-(N-octadecyl-N-vinylbenzylamino)propanesulfonic acid-(1), 2-(N-isopropenylbenzyl-N-octadecylamino)propanesulfonic acid-(1), 1-(N-methyl-N-vinylbenzylamino)-2-methylpropanesulfonic acid-(2), 1-(N-isopropenylbenzyl-N-methylamino)-2-methylpropanesulfonic acid-(2), 3-(N-methyl-N-vinylbenzylamino)propanesulfonic acid-(1), 3-(N-isopropenylbenzyl-N-methylamino)propanesulfonic acid-(1), N-(vinylbenzyl)anthranilic acid, N-(vinylbenzyl)-m-aminobenzoic acid, N-(vinylbenzyl)-p-aminobenzoic acid, N-(vinylbenzyl)orthanilic acid, N-(vinylbenzyl)metanilic acid, N-(vinylbenzyl)sulfanilic acid, etc.

As the other polymerizable monomers to be polymerized with the said polymerizable amino acid compounds for production of the polymeric resin of the invention, there may be used any monomeric compounds having an ethylenic unsaturation. Examples of them are as follows: hydroxyl group-containing monomers (e.g. 2-hydroxyethyl acrylate, 3-hydroxypropyl acrylate, 2-hydroxyethyl methacrylate, 3-hydroxypropyl methacrylate, 3-hydroxybutyl acrylate, 4-hydroxybutyl methacrylate, allyl alcohol, methallyl alcohol), carboxyl group-containing monomers (e.g. acrylic acid, methacrylic acid, protonic acid, itaconic acid, maleic acid, fumaric acid), glycidyl group-containing monomers (e.g. glycidyl acrylate, glycidyl methacrylate), alkyl acrylates and alkyl methacrylates (e.g. methyl acrylate, methyl methacrylate, ethyl acrylate, n-butyl acrylate, n-butyl methacrylate, 2-ethylhexyl acrylate), nitrogen-containing alkyl acrylates and nitrogen-containing alkyl methacrylates (e.g. N,N-dimethylaminoethyl acrylate, N,N-dimethylaminoethyl methacrylate), polymerizable amides (e.g. acrylamide, methacrylamide, n-butoxymethylacrylamide), polymerizable nitriles (e.g. acrylonitrile, methacrylonitrile), polymerizable aromatic compounds (e.g. styrene, α-methylstyrene, vinyltoluene, t-butylstyrene), α-olefinic compounds (e.g. ethylene, propylene), vinylic compounds (e.g. vinyl acetate, vinyl propionate), diene compounds (e.g. butadiene, isoprene), etc.

The polymeric resin of the invention may be produced by subjecting at least one of the polymerizable amino acid compounds (i.e. at least one of the compounds (Ia) and (Ib) with or without at least one of the other polymerizable monomers to solution polymerization in an organic solvent according to a per se conventional radical polymerization procedure.

When the other polymerizable monomers are used, the amount of the polymerizable amino acid compound may be varied depending on the desired properties and the intended purposes of the resulting polymeric resin. Usually, its amount may be from 0.1 to 50% by weight, preferably from 0.2 to 30% by weight based on the total weight of the polymerizable monomeric compounds. In case of the amount being lower than 0.1% by weight, the characteristic properties of the polymerizable amino acid compound will not be exerted. In case of the amount being higher than 50% by weight, the water resistance of the coating film produced from the resulting polymeric resin will be lowered.

As the radical initiator for the solution polymerization, there may be used any conventional one. Specific examples are peroxides (e.g. benzoyl peroxide, di-t-butyl peroxide, cumene hydroperoxide), azo compounds (e.g. azobisisobutyronitrile, 2,2'-azobis(2,4-dimethyl)valeronitrile, 4,4'-azobis-4-cyanovaleric acid), etc. It may be employed usually in an amount of from 0.05 to 5% by weight, preferably from 0.1 to 4% by weight based on the total weight of the polymerizable monomeric compounds. In addition, any conventional chain-transfer agent such as mercaptans (e.g. laurylmercaptan, hexylmercaptan) may be employed when desired.

As the organic solvent, there may be employed any conventional one, of which examples are alcohols having not more than 6 carbon atoms (e.g. methanol, ethanol), diols (e.g. ethylene glycol, propylene glycol, butylene glycol), ketones (e.g. acetone, methylethylketone, methylisobutylketone), etheric alcohols (e.g. ethylene glycol monomethyl ether, ethylene glycol monoethyl ether, ethylene glycol monobutyl ether, 3-methyl-3-methoxybutanol), aromatic hydrocarbons (e.g. benzene, xylene, toluene), etc.

The solution polymerization may be carried out by a per se conventional radical polymerization procedure. For instance, the polymerizable monomeric compounds are subjected to polymerization in the presence of a radical initiator in an organic solvent by elevating the temperature to a desired polymerization temperature (usually from 40° to 250° C.). Alternatively, for instance, the polymerizable monomeric compounds are dropwise added to an organic solvent maintained at a desired polymerization temperature, followed by aging. A radical initiator may be included in the polymerizable monomeric compounds and/or the organic solvent. The polymerization is usually completed within 0.5 to 20 hours.

The thus prepared polymeric resin is ordinarily available in the form of a solution having a solid content of 5 to 80% by weight and a viscosity of A to $Z_6$ (according to the Gardner indication). The number average molecular weight ($\overline{M}n$) of the polymeric resin determined by GPC is normally from 1,000 to 50,000.

The coating composition of the invention comprises the polymeric resin as prepared above as a main component. Such composition may additionally comprise an organic or inorganic pigment, a crosslinking agent (particularly an aminoplast resin), a filler, a surfactant, an organic solvent, etc. Since the polymeric resin has an excellent pigment dispersibility, its mixture with an organic or inorganic pigment affords a stable and uniform pigment paste.

Particularly when the polymeric resin is the one prepared by the use of a hydroxyl group-containing polymerizable monomer (usually in an amount of not more than 30% by weight based on the total weight of the polymerizable monomeric compounds) as the other polymerizable monomer, it is preferably employed in a composition with an aminoplast resin. The aminoplast resin may be any conventional one, of which examples are melamine resins, urea resins, guanamine resins, etc. In use, the aminoplast resin may be previously dissolved in an organic solvent such as ethylene glycol monoalkyl ether or diethylene glycol monoalkyl ether, if necessary. The amount of the aminoplast resin is usually from 5 to 100% by weight (in terms of solid weight) on the basis of the polymeric resin. The composition comprising the polymeric resin and the aminoplast resin is characteristic in being curable at a low temperature (e.g. 60° to 200° C.) within a short period of time (e.g. 30 seconds to 60 minutes).

When the polymerizable amino acid compound is polymerized with a carboxyl group-containing polymerizable monomer (and any other polymerizable monomer), there is obtainable a polymeric resin which is easily dispersible in an aqueous medium.

As the carboxyl group-containing polymerizable monomer, there may be specifically employed acrylic acid, methacrylic acid, crotonic acid, itaconic acid, maleic acid, fumaric acid, etc. These monomers may be used alone or in combination. As the other polymerizable monomer, there may be used any ordinary one having an ethylenic unsaturation. Examples are hydroxyl group-containing monomers, alkyl acrylates and alkyl methacrylates, nitrogen-containing alkyl acrylates and nitrogen-containing alkyl methacrylates, polymerizable amides, polymerizable nitriles, polymerizable aromatic compounds, α-olefinic compounds, vinylic compounds, diene compounds, etc. These may be used alone or in combination.

The amounts of the polymerizable amino acid compound(s) and the carboxyl group-containing polymerizable monomer(s) may be respectively from 0.1 to 50% by weight and from 3 to 30% by weight based on the total weight of the polymerizable monomeric compounds. When the polymerizable amino acid compound(s) are less than 0.1% by weight, their characteristic properties are not exerted in the resulting polymeric resin. When the polymerizable amino acid compound(s) are more than 50% by weight, the water-philic property of the produced polymeric resin is increased so that the water resistance of the coating film formed thereby will be lowered. In case of the carboxyl group-containing polymerizable monomer being less than 3% by weight, the water-philic property of the resulting polymeric resin is insufficient so that the water-dispersibility is much deteriorated. In case of the carboxyl group-containing polymerizable monomer being more than 30% by weight, the water resistance of the coating film formed by the resultant polymeric resin will be inferior.

For production of the said polymeric resin excellent in dispersibility into an aqueous medium, at least one of the polymerizable amino acid compounds and at least one of the carboxyl group-containing polymerizable monomers with or without at least one of the other polymerizable monomers may be subjected to solution polymerization as hereinbefore explained. The polymerization product is then neutralized, for instance, with a basic substance and dispersed into an aqueous medium to make an appropriate concentration of the polymeric resin. Examples of the basic substance are ammonia, amines (e.g. trimethylamine, diethylamine, triethylamine, tributylamine, diethanolamine, dimethylethanolamine, diethylethanolamine, 2-amino-2-methyl-1-propanol, morpholine, pyridine), inorganic alkaline substances (e.g. potassium hydroxide, sodium hydroxide, lithium hydroxide, calcium hydroxide), etc. The amount of the basic substance may be usually from 0.1 to 2 molar equivalents to the total acid amount in the polymeric resin.

The thus obtained polymeric resin dispersion in an aqueous medium is ordinarily available in the form of a dispersion having a non-volatile component content of 5 to 80% by weight. The polymeric resin itself has a number average molecular weight of 1,000 to 50,000 and a glass transition point of −40° to +100° C.

The aqueous dispersion of the polymeric resin is usable as a coating composition, particularly in the form of a composition admixed with an aminoplast resin. Examples and use modes of the aminoplast resin are as hereinabove stated. The amount of the aminoplast resin to be incorporated is not limitative but may be usually from 5 to 100 parts by weight, preferably from 10 to 50 parts by weight (in terms of solid) to 100 parts by weight of the polymeric resin in the aqueous dispersion. When the aminoplast resin is less than the lower limit, the curing is insufficient. When more than the upper limit, the coating film formed from the resulting composition will be too brittle.

In addition to the polymeric resin and the aminoplast resin, there may be optionally incorporated any conventional additive such as organic or inorganic pigments, fillers, thickening agents, surfactants, pH regulators, water and organic solvents. The incorporation can be easily effected by mixing at room temperature.

The coating composition of the invention is usually applied to a substrate to make a film thickness of 5 to 500 microns, followed by baking (e.g. at 60° to 200° C. for 30 seconds to 60 minutes) to afford a coating film having good appearance and excellent physical properties. It is notable that the coating composition has a good storage stability and a easy curability. It is also notable that the coating film formed with such coating composition is excellent in various physical characteristics such as water resistance, solvent resistance, corrosion resistance, hardness and surface gloss.

This invention will be illustrated in detail with reference to Reference Examples, Examples and Comparative Examples as shown below, part(s) and (%) are by weight unless otherwise indicated.

REFERENCE EXAMPLE 1

Into a 2 liter volume flask equipped with a stirrer, N-methyltaurine sodium salt (161 g), deionized water (400 g) and ethylene glycol monomethyl ether (300 g) were charged. The contents were maintained at 70° C. while stirring, and a mixture of vinylbenzyl chloride (153 g), ethylene glycol monomethyl ether (100 g) and p-nitrosophenol (0.15 g) was dropwise added thereto in 1 hour, during which sodium hydroxide (each 8 g) was added thereto 6 times with intervals of 10 minutes. Thereafter, stirring was continued for 5 hours. To the reaction mixture, conc. hydrochloric acid (120 g) was added, and the resulting mixture was concentrated in a rotary evaporator to make a ½ volume. The concentrate was admixed with a 4 time volume of acetone and filtered. The filtrate was concentrated to a 3/10 volume and admixed with acetone. The precipitated yellow solids were collected and recrystallized from deionized water to give N-methyl-N-vinylbenzyltaurine (180 g) of the formula:

$$CH_2=CH-C_6H_4-CH_2-N(CH_3)-CH_2CH_2-SO_3H$$

REFERENCE EXAMPLE 2

Into a 2 liter volume flask equipped with a stirrer, taurine (250 g), sodium hydroxide (80 g), deionized water (500 g) and ethylene glycol monomethyl ether (400 g) were charged. The contents were maintained at 70° C. while stirring, and a mixture of vinylbenzyl chloride (153 g), ethylene glycol monomethyl ether (250 g) and p-nitrosophenol (0.15 g) was dropwise added thereto in 1 hour, during which sodium hydroxide (each 8 g) was added thereto 6 times with intervals of 10 minutes. Thereafter, stirring was continued for 4 hours. To the reaction mixture, conc. hydrochloric acid (220 g) was added, whereby white solids (Product I) (57 g) were precipitated. The filtrate was concentrated in a rotary evaporator to make a 3/10 volume, and the precipitated solids were extracted with a 4 time volume of hot acetone. The extract was cooled, and the precipitated white solids (Product II) (126 g) were collected and dried in vacuo. The Products I and II were repsectively identified as N,N-di(vinylbenzyl)taurine of the formula:

$$(CH_2=CH-C_6H_4-CH_2)_2N-CH_2CH_2-SO_3H$$

and N-vinylbenzyltaurine of the formula:

$$CH_2=CH-C_6H_4-CH_2-NH-CH_2CH_2-SO_3H$$

by NMR and IR.

REFERENCE EXAMPLE 3

In the same manner as in Reference Example 2 but using β-alanine (178 g) in place of taurine (250 g), the reaction was carried out to obtain N-(vinylbenzyl)-β-alanine (92 g) of the formula:

$$CH_2=CH-C_6H_4-CH_2-NH-CH_2CH_2-COOH$$

REFERENCE EXAMPLE 4

Into a 2 liter volume flask equipped with a stirrer, taurine (125 g), sodium hydroxide (40 g), deionized water (200 g) and ethylene glycol monoethyl ether (600 g) were charged. The contents were maintained at 60° C. while stirring, and a mixture of allyl glycidyl ether (114 g) and p-nitrosophenol (0.1 g) was dropwise added thereto in 20 minutes. Thereafter, stirring was continued for 2 hours. The reaction mixture of pH 9 was treated with an ionic exchange resin (Amberlite IR-120) to eliminate Na+ ion, whereby a solution of pH 4 was obtained. The solution was concentrated in a rotary evaporator to make a 7/10 volume so that needle crystals were precipitated. These crystals were identified to unreacted taurine by NMR and IR. The filtrate was poured into a 3 time volume of acetone to precipitate brown oily materials. The oily materials were collected and dried in vacuo as give N-(2-hydroxy-3-allyloxypropyl)taurine (96 g) of the formula:

$$CH_2=CH-CH_2OCH_2-\underset{\underset{OH}{|}}{CH}-CH_2NH-CH_2CH_2-SO_3H$$

REFERENCE EXAMPLE 5

In the same manner as in Reference Example 2 but using metanilic acid (348 g) in place of taurine (250 g), the reaction was carried out to obtain N-(vinylbenzyl)-metanilic acid (73 g) of the formula:

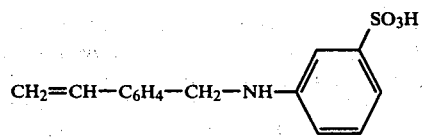

REFERENCE EXAMPLE 6

In the same manner as in Reference Example 2 but using sulfanilic acid (348 g) in place of taurine (250 g), the reaction was carried out to obtain N-(vinylbenzyl)-sulfanilic acid (45 g) of the formula:

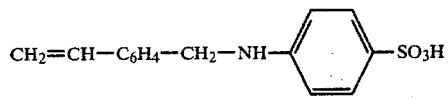

EXAMPLE 1

In a 2 liter volume reactor, ethylene glycol monomethyl ether (100 parts) was charged, and the temperature was elevated to 100° C. In one of two dropping funnels equipped on the reactor, ethylene glycol monomethyl ether (100 parts), N-methyl-N-(vinylbenzyl)taurine (2.5 parts) and a small amount of dimethylethanolamine as a solubilizer were charged. In the other dropping funnel, 2-hydroxyethyl acrylate (50 parts), acrylic acid (10 parts), methyl methacrylate (115 parts), styrene (135 parts), n-butyl acrylate (197.5 parts) and laurylmercaptan (2.5 parts) were charged, and azobisisobutyronitrile (10 parts) was dissolved therein. The contents in the dropping funnels were dropwise added to the reactor in 2 hours, during which the temperature was maintained at 100° C. and stirring was continued. Thirty minutes after completion of the dropwise addition, xylene (300 parts) was added to the reaction mixture to give a resinous solution having a solid content of 50%, a viscosity of U and a number average molecular weight of 6,500.

By dispersing a pigment such as titanium oxide, carbon black, red iron oxide or phthalocyanine blue into the resinous solution, there was obtained a pigment paste having a high stability.

EXAMPLE 2

In the same manner as in Example 1 but using the following materials, there was obtained a resinous solution having a viscosity of S and a number average molecular weight of 6,500:

|  | Part(s) |
|---|---|
| N-(Vinylbenzyl)taurine | 10 |
| 2-Hydroxyethyl acrylate | 50 |
| Acrylic acid | 25 |
| Methyl methacrylate | 100 |
| Styrene | 100 |
| n-Butyl acrylate | 215 |
| Laurylmercaptan | 5 |
| Azobisisobutyronitrile | 10 |
| Xylene | 250 |
| Ethylene glycol monomethyl ether | 150 |
| Ethylene glycol monobutyl ether | 100 |

The resinous solution (100 parts) was admixed with a butylated melamine resin ("Super Beckamin G-821" manufactured by Dainippon Ink and Chemicals, Inc.) (30 parts). The resulting composition was applied onto the surface of a metal plate and baked at 80° to 100° C. for 30 minutes to give a coating film completely cured and having excellent physical properties.

EXAMPLES 3 to 12

In the same manner as in Example 1 but using the materials as shown in Table 1, there were obtained resinous solutions, of which the viscosity and the number average molecular weight are also shown in Table 1.

The obtained resinous solutions showed nearly the same level as those obtained in Examples 1 and 2 in pigment dispersibility and low temperature curing characteristics when admixed with aminoplast resins.

TABLE 1

| Component (parts) | Example No. | | | | | | | | | |
|---|---|---|---|---|---|---|---|---|---|---|
|  | 3 | 4 | 5 | 6 | 7 | 8 | 9 | 10 | 11 | 12 |
| Polymerizable amino acid compound*(1) | 5 | 10 | 10 | 10 | 25 | 60 | 125 | 20 | 10 | 10 |
| 2-Hydroxyethyl acrylate | 25 | — | 50 | — | 50 | 50 | 50 | — | 50 | 50 |
| 2-Hydroxyethyl methacrylate | — | — | — | — | — | — | — | 50 | — | — |
| Acrylic acid | 15 | — | — | — | 10 | 10 | 10 | 10 | 10 | 10 |
| Methacrylic acid | — | 10 | — | — | — | — | — | — | — | — |
| n-Butoxymethyl acrylamide | 90 | — | — | — | — | — | — | — | — | — |
| N,N-Dimethylaminoethyl methacrylate | — | — | 20 | — | — | — | — | — | — | — |
| Glycidyl methacrylate | — | — | — | 80 | — | — | — | — | — | — |
| Methyl methacrylate | 100 | 150 | — | 100 | 125 | 100 | 100 | — | 100 | 100 |
| Styrene | 125 | 150 | 150 | 150 | — | 50 | 75 | 100 | 100 | 100 |
| Methyl acrylate | — | 180 | — | — | 100 | — | — | 320 | — | — |
| n-Butyl acrylate | — | — | — | 160 | 90 | 240 | — | — | 230 | 230 |
| n-Butyl methacrylate | — | — | 150 | — | 100 | 100 | — | — | — | — |
| 2-Ethylhexyl acrylate | 140 | — | 120 | — | — | — | 140 | — | — | — |
| Laurylmercaptan | 5 | 2.5 | 5 | 5 | 5 | 5 | 5 | 5 | 5 | 5 |
| Azobisisobutyronitrile | 10 | 10 | 10 | 10 | 10 | 10 | 10 | 10 | 10 | 10 |
| Toluene | — | 250 | — | — | — | — | — | — | — | — |
| Xylene | 250 | — | 250 | 250 | 200 | 200 | 200 | 250 | 250 | 250 |
| Ethylene glycol monomethyl ether | 150 | 250 | 150 | 150 | 200 | 200 | 200 | 150 | 150 | 150 |
| Ethylene glycol monobutyl ether | 100 | — | 100 | 100 | 100 | 100 | 100 | 100 | 100 | 100 |
| Viscosity | T | Y | S | S | T | S | X | T | T | V |
| Number average molecular | 6200 | 8800 | 6300 | 6200 | 6500 | 6000 | 7200 | 6800 | 6800 | 7000 |

TABLE 1-continued

| Component | Example No. | | | | | | | | | |
|---|---|---|---|---|---|---|---|---|---|---|
| (parts) | 3 | 4 | 5 | 6 | 7 | 8 | 9 | 10 | 11 | 12 |
| weight ($\overline{Mn}$). | | | | | | | | | | |

Note:
*(1)Examples 3 to 6, N-methyl-N-vinylbenzyltaurine; Examples 7 to 9, N-vinylbenzyl-β-analine; Example 10, N-(2-hydroxy-3-allyloxypropyl)taurine; Example 11, N-vinylbenzyl-metanilic acid; Example 12, N-vinylbenzyl-sulfanilic acid.

EXAMPLE 13

Into a 2 liter volume flask equipped with a stirrer, ethylene glycol monomethyl ether (61.6 parts) was charged, and the temperature was elevated to 110° C. while stirring. A mixture of ethylene glycol monomethyl ether (32 parts), N-(2-hydroxy-3-allyloxypropyl)taurine (8 parts) and 2-hydroxyethyl acrylate (40 parts) and a mixture of styrene (99.6 parts), methyl methacrylate (99.6 parts), n-butyl acrylate (132.8 parts), acrylic acid (20 parts) and azobisisobutyronitrile (6 parts) were dropwise added thereto in 2.5 hours. After completion of the dropwise addition, a mixture of azobisisobutyronitrile (2 parts) and methylethylketone (12 parts) was dropwise added thereto in 30 minutes, and stirring was continued at 110° C. for 1 hour. To the reaction mixture, dimethylethanolamine (17.2 parts) and then deionized water (685.2 parts) were added to give a resinous dispersion showing a white emulsion and containing non-volatile components in an amount of 33%. Number average molecular weight, 25,000. Glass transition point, 19.5° C.

EXAMPLES 14 to 26 and COMPARATIVE EXAMPLES 1 and 2

In the same manner as in Example 13 but using the materials as shown in Table 2, there were obtained resinous dispersions, of which transparency, non-volatile component content, number average molecular weight and glass transition point are also shown in Table 2.

TABLE 2

| Component (parts) | Example | | | | | | | | | | | | | | Comparative Example | |
|---|---|---|---|---|---|---|---|---|---|---|---|---|---|---|---|---|
| | 14 | 15 | 16 | 17 | 18 | 19 | 20 | 21 | 22 | 23 | 24 | 25 | 26 | | 1 | 2 |
| Ethylene glycol monomethyl ether | 14.8 | 80 | 80 | 80 | 80 | 15 | 15 | 80 | 80 | 15 | 15 | — | 80 | | 80 | 80 |
| Isopropanol | — | — | — | — | — | — | — | — | — | — | — | 15 | — | | — | — |
| Ethylene glycol monomethyl ether | 32 | 120 | 120 | 120 | 120 | 32 | 32 | 120 | 120 | 32 | 32 | — | 120 | | 120 | 120 |
| Isopropanol | — | — | — | — | — | — | — | — | — | — | — | 32 | — | | — | — |
| N-(2-Hydroxy-3-allyloxypropyl)-taurine | 8 | — | — | — | — | — | — | — | — | — | — | — | — | | — | — |
| N-Vinylbenzyl-taurine | — | 4.8 | 4.8 | 9.6 | 9.6 | 8 | — | — | — | — | — | — | — | | — | — |
| N-Methyl-N-vinylbenzyltaurine | — | — | — | — | — | — | 4 | 4 | 4 | 16 | 4 | 4 | 0.8 | | — | — |
| 2-Hydroxyethyl acrylate | 40 | 40 | 40 | 40 | 40 | 40 | 40 | 40 | 28 | 40 | 40 | 40 | 40 | | 40 | 40 |
| Dimethylaminoethyl methacrylate | — | — | — | — | — | — | — | — | — | — | 26 | — | — | | — | — |
| Dimethylethanolamine | — | 0.88 | 0.88 | 1.76 | 1.76 | — | 1.4 | 1.4 | 1.4 | 5.6 | 1.4 | 1.4 | 0.28 | | — | — |
| Styrene | 93.6 | 100.6 | 94.6 | 99.1 | 93.1 | 97.2 | 98.4 | 98.4 | 102 | 94.8 | 90.6 | 98.6 | 99.4 | | 102 | 96 |
| Methyl methacrylate | 93.6 | 100.6 | 94.6 | 99.1 | 93.1 | 97.2 | 98.4 | 98.4 | 102 | 94.8 | 90.6 | 98.6 | 99.4 | | 102 | 96 |
| n-Butyl acrylate | 124.8 | 134.1 | 126.1 | 132.2 | 124.2 | 129.6 | 131.2 | 131.2 | 136 | 126.4 | 120.8 | — | 132.5 | | 136 | 128 |
| 2-Ethylhexyl acrylate | — | — | — | — | — | — | — | — | — | — | — | 131.2 | — | | — | — |
| Acrylic acid | 40 | 20 | 40 | 20 | 40 | 28 | 28 | 28 | 28 | 28 | 28 | 19.6 | 28 | | 20 | 40 |
| Itaconic acid | — | — | — | — | — | — | — | — | — | — | — | 7.6 | — | | — | — |
| Azobisisobutyronitrile | 6 | 6 | 6 | 6 | 6 | 6 | 6 | 6 | 6 | 6 | 6 | 6 | 6 | | 6 | 6 |
| Laurylmercaptan | — | 8 | 8 | 8 | 8 | 4 | 4 | 4 | 8 | 8 | 8 | 8 | 8 | | 8 | 8 |
| Azobisisobutyronitrile | 2 | 2 | 2 | 2 | 2 | 2 | 2 | 2 | 2 | 2 | 2 | 2 | 2 | | 2 | 2 |
| Methylethylketone | 12 | 12 | 12 | 12 | 12 | 12 | 12 | 12 | 12 | 12 | 12 | 12 | 12 | | 12 | 12 |
| Dimethylethanolamine | 34.6 | 20 | 40 | 24.8 | 49.6 | 34.6 | 34.6 | 34.6 | 34.6 | 34.6 | 34.6 | 34.6 | 34.6 | | 24.8 | 49.6 |
| Ethylene glycol monomethyl ether | — | 89.6 | 79.6 | 82.7 | 70.3 | — | — | 182 | 182 | — | — | — | 184 | | 82.7 | 70.3 |
| Deionized water | 670 | 289.6 | 279.6 | 282.7 | 270.3 | 670 | 670 | 382 | 382 | 670 | 670 | 670 | 382 | | 282.7 | 270.3 |
| Transparency*(1) | x | Δ | 0 | Δ | 0 | Δ | Δ | 0 | 0 | Δ | Δ | Δ | 0 | | Δ | 0 |
| Non-volatile component content (%) | 33 | 50 | 50 | 50 | 50 | 33 | 33 | 33 | 33 | 33 | 33 | 33 | 33 | | 33 | 33 |
| Number average molecular weight ($\overline{Mn}$) | 25000 | 5500 | 5500 | 5500 | 5500 | 9000 | 9000 | 8400 | 5500 | 6000 | 6000 | 6000 | 5500 | | 5500 | 5500 |
| Glass transition | 23.0 | 19.1 | 22.5 | 19.8 | 23.2 | 21.0 | 20.3 | 20.3 | 21.5 | 22.3 | 20.3 | 1.1 | 19.8 | | — | — |

TABLE 2-continued

| Component (parts) | Example 14 | 15 | 16 | 17 | 18 | 19 | 20 | 21 | 22 | 23 | 24 | 25 | 26 | Comparative Example 1 | 2 |
|---|---|---|---|---|---|---|---|---|---|---|---|---|---|---|---|
| point (°C.) | | | | | | | | | | | | | | | |

Note:
*(1)Transparent, 0; semi-transparent, Δ; non-transparent, x.

EXAMPLE 27

The resinous dispersion obtained in any of Examples 15 to 18 and Comparative Examples 1 and 2 and an aminoplast resin ("Cymel 303" manufactured by Mitsui-Toatsu Co., Ltd.) were mixed together in a solid ratio of 8:2 by weight to prepare a coating composition. The coating composition was applied onto a zinc-plated iron sheet to make a film thickness of 30 microns (after drying) and baked at 120° C., 140° C. or 160° C. for 30 minutes for curing.

The solubility of the cured coating film in a solvent for paint (thinner) when immersed for 1 hour is shown in Table 3, wherein the solubility was calculated according to the following equation:

$$\text{Solubility (\%)} = \frac{B - C}{B - A} \times 100$$

wherein A is the weight of the zinc-plated iron sheet, B is the total weight of the zinc-plated iron sheet and the coating film before immersion and C is the total weight of the zinc-plated iron sheet and the coating film after immersing and drying at 120° C. for 20 minutes.

TABLE 3

| | | Temperature for baking | | |
|---|---|---|---|---|
| | | 120° C. | 140° C. | 160° C. |
| Example | 15 | 45 | 12 | 2 |
| | 16 | 45 | 7 | 0 |
| | 17 | 24 | 6 | 3 |
| | 18 | 22 | 4 | 0 |
| Comparative Example | 1 | 100 | 64.7 | 27.6 |
| | 2 | 100 | 21.6 | 2.7 |

EXAMPLE 28

As in Example 27, the resinous dispersion obtained in Example 15 or 17 or Comparative Example 1 was admixed with an aminoplast resin to prepare a coating composition. Then, the coating composition was applied onto a zinc-plated iron sheet, followed by baking at 140° C. for 30 minutes for curing.

The solubility and the swelling of the cured coating film when immersed in boiling water for 1 hour are shown in Table 4, wherein the solubility was calculated according to the equation as shown in Example 27 and the swelling was calculated according to the following equation:

$$\text{Swelling (\%)} = \frac{D - C}{C - A} \times 100$$

wherein A is the weight of the zinc-plated iron sheet, C is the total weight of the zinc-plated iron sheet and the coating film after immersing for 1 hour and drying at 120° C. for 20 minutes and D is the total weight of the zinc-plated iron sheet and the coating film immediately after immersing.

TABLE 4

| | | Solubility (%) | Swelling (%) |
|---|---|---|---|
| Example | 15 | 7.0 | 7.5 |
| | 16 | 5.8 | 6.3 |
| Comparative Example | 1 | 21.6 | 55.6 |

EXAMPLE 29

The resinous dispersion obtained in any of Examples 20 to 26, carbon black ("Mitsubishi Carbon MA-100" manufactured by Mitsubishi Chemical Co., Ltd.) and an aminoplast resin were mixed together in a solid ratio of 85:2:15 by weight to prepare a black coating composition. The coating composition was applied onto a dull steel plate to make a film thickness of 30 microns (after drying) and baked at 120° C. or 140° C. for 30 minutes for curing.

The width of peeling by a tape after salt spraying for 96 hours examined on the cured coating film was not more than 3 mm.

What is claimed is:

1. In a pigment-containing coating composition, the improvement wherein the composition contains as a main component a polymeric resin obtained by solution polymerization of at least one polymerizable amino acid compound of the formula:

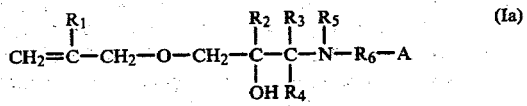
(Ia)

wherein $R_1$, $R_2$, $R_3$ and $R_4$ are each hydrogen, methyl or ethyl, $R_5$ is hydrogen, $C_1$-$C_{20}$ alkyl or $C_1$-$C_{20}$ alkyl having —SO—, —COO— or —O— therein, $R_6$ is (a) $C_1$-$C_{12}$ alkylene, (b) $C_1$-$C_{12}$ alkylene substituted by $C_1$-$C_4$ alkyl, —OH, —SH or —$SR_7$ wherein $R_7$ is $C_1$-$C_4$ alkyl, (c) phenylene or (d) phenylene substituted by $C_1$-$C_4$ alkyl and A is —$SO_3H$, or

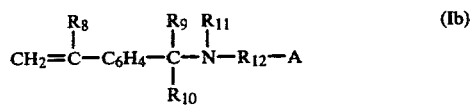
(Ib)

wherein $R_8$, $R_9$ and $R_{10}$ are each hydrogen or $C_1$-$C_6$ alkyl, $R_{11}$ is hydrogen, $C_1$-$C_{20}$ alkyl, $C_1$-$C_{20}$ alkyl having —SO—, —COO—, or —O— therein, or a group of the formula:

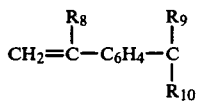

wherein $R_8$, $R_9$ and $R_{10}$ are as defined above, $R_{12}$ is $C_2$–$C_{12}$ alkylene, $C_2$–$C_{12}$ alkylene substituted with $C_1$–$C_6$ alkyl, phenylene, or phenylene substituted with $C_1$–$C_4$ alkyl, and A is —$SO_3H$, alone or with at least one other polymerizable monomer having ethylenic unsaturation, with the proviso that when other polymerizable monomer is ued the amount of the polymerizable amino acid compound is from 0.1 to 50% by weight based on the total weight of the polymerizable monomeric compounds.

2. A composition according to claim 1 wherein the polymeric resin is one obtained by solution polymerization of at least one of the polymerizable amino acid compounds with at least one other polymerizable monomer having ethylenic unsaturation.

3. A composition according to claim 2 wherein the other polymerizable monomers are selected from the group consisting of hydroxyl group-containing monomers, carboxyl group-containing monomers, glycidyl group-containing monomers, alkyl acrylates and alkyl methyacrylates, nitrogen-containing alkyl acrylates and nitrogen-containing alkyl methacrylates, polymerizable amides, polymerizable nitriles, polymerizable aromatic compounds, α-olefinic compounds, vinyl alkanoate and diene compounds.

4. A composition according to claim 2 wherein the other polymerizable monomers are hydroxyl group-containing monomers.

5. A polymeric resin prepared by solution polymerization of (a) at least one polymerizable amino acid compound of the formulas:

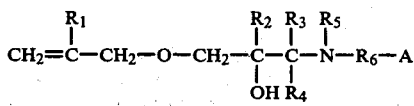

wherein $R_1$, $R_2$, $R_3$ and $R_4$ are each hydrogen, methyl or ethyl, $R_5$ is hydrogen, $C_1$–$C_{20}$ alkyl or $C_1$–$C_{20}$ alkyl having —SO—, —COO— or —O— therein, $R_6$ is (a) $C_1$–$C_{12}$ alkylene, (b) $C_1$–$C_{12}$ alkylene substituted by $C_1$–$C_4$ alkyl, —OH, —SH or —$SR_7$ wherein $R_7$ is $C_1$–$C_4$ alkyl, (c) phenylene or (d) phenylene substituted by $C_1$–$C_4$ alkyl and A is —$SO_3H$, or

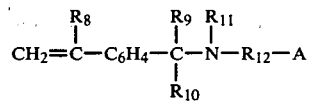

wherein $R_8$, $R_9$ and $R_{10}$ are each hydrogen or $C_1$–$C_6$ alkyl, $R_{11}$ is hydrogen, $C_1$–$C_{20}$ alkyl, $C_1$–$C_{20}$ alkyl having —SO—, —COO— or —O— therein, or a group of the formula:

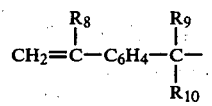

wherein $R_8$, $R_9$ and $R_{10}$ are as defined above, $R_{12}$ is $C_2$–$C_{12}$ alkylene, $C_2$–$C_{12}$ alkylene substituted with $C_1$–$C_6$ alkyl, phenylene or phenylene substitued with $C_1$–$C_4$ alkyl, and A is —$SO_3H$, (b) at least one carboxyl group-containing monomer and (c) at least one other polymerizable monomer having ethylenic unsaturation, the polymeric resin having a number average molecular weight of 1,000 to 50,000 and a glass transition point of −40° to +100° C. and the amount of the polymerizable amino compound being from 0.1 to 50% by weight based on the total weight of the polymerizable monomeric compounds.

6. A resin according to claim 5 wherein the solution polymerization is effected in a water-miscible organic solvent.

7. A resin according to claim 5 wherein component (a) is a polymerizable amino acid compound of the formula (Ib).

8. A resin according to claim 5, wherein the other polymerizable monomers as the component (c) are selected from the group consisting of hydroxyl group-containing monomers, alkyl acrylates and alkyl methacrylates, nitrogen-containing alkyl acrylates and nitrogen-containing alkyl methacrylates, polymerizable amides, polymerizable nitriles, polymerizable aromatic compounds, α-olefinic compounds, vinyl alkanoate and diene compounds.

9. A resin according to claim 5, wherein the other polymerizable monomers are hydroxyl group-containing monomers.

10. A dispersion of the polymeric resin according to claim 1 in an aqueous medium containing non-volatile components in an amount of 5 to 80% by weight.

* * * * *